Patented Sept. 17, 1935

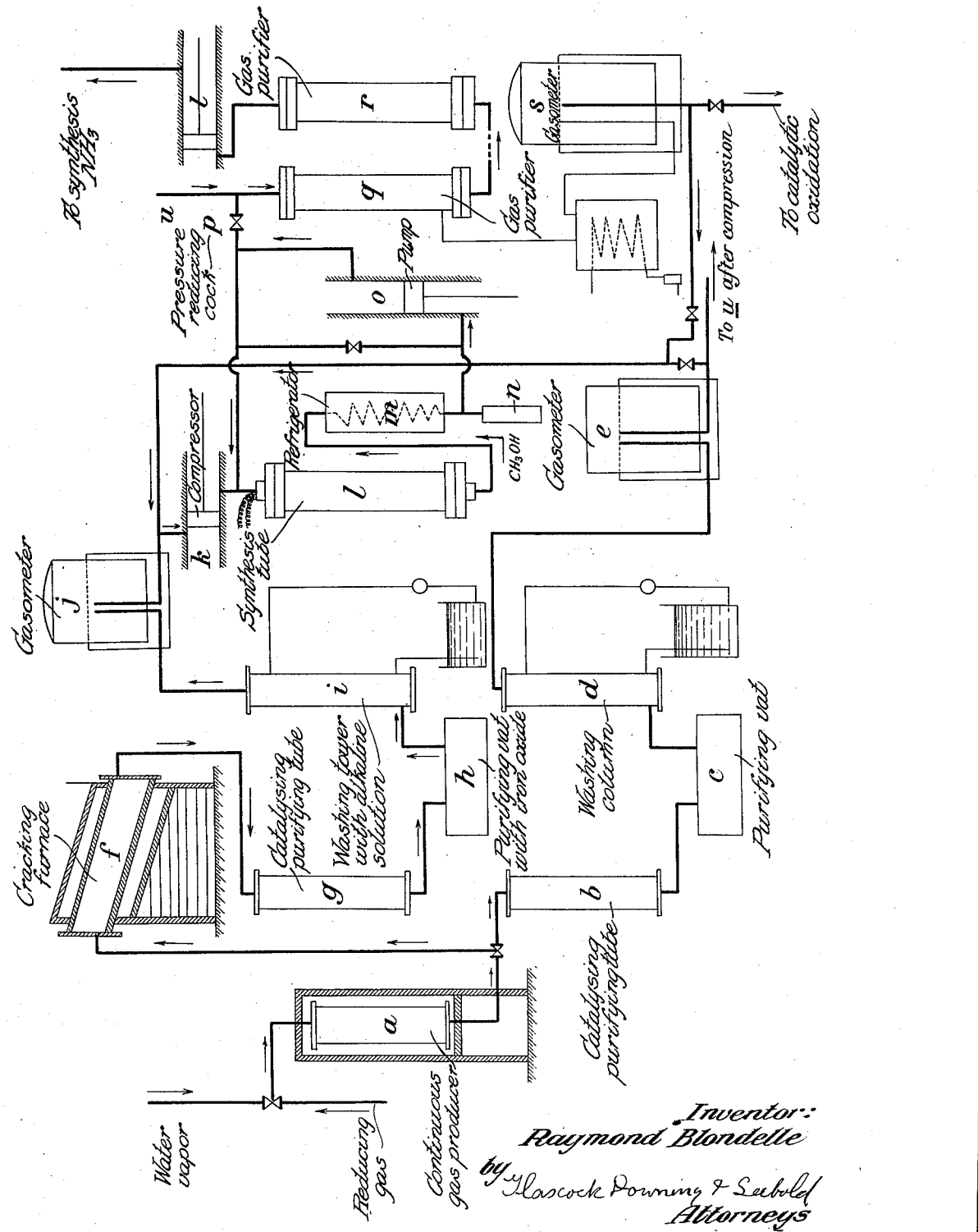

2,014,757

UNITED STATES PATENT OFFICE 2,014,757

PROCESS FOR THE INTEGRAL TRANSFORMATION OF COKE OVEN GAS OR TOWN GAS INTO AMMONIA AND METHYL ALCOHOL

Raymond Blondelle, Henin Lietard, France, assignor to Societé Des Mines De Dourges, Henin Lietard, France Application January 9, 1931, Serial No. 507,751
In France February 28, 1930

1 Claim. (Cl. 23—7)

The process forming the subject-matter of this invention has for object the integral transformation of coke oven gas, or of similar gases, into methyl alcohol and ammonia.

It is known that for obtaining the mixture of hydrogen and nitrogen used for the synthesis of ammonia, heterogeneous industrial gases which often contain carbon monoxide are initially employed.

It has already been attempted to combine carbon monoxide with hydrogen for forming methanol and to thus purify the mixture intended to be used for the synthesis of ammonia. Interesting results have been obtained in this direction as long as very small quantities of carbon monoxide were to be combined. But the problem is different when important quantities of carbon monoxide are in presence of hydrogen and nitrogen. In fact, during the synthesis of methanol, parasitic reactions take place, giving rise to hydrocarbons, ethers, aldehydes, ketones, acids, etc., so that the gaseous mixture after contact with the methanol catalyst and condensation of the alcohol, contains such impurities that it cannot be economically employed for the synthesis of ammonia.

In practice, it has not yet been possible to combine the synthesis of methanol with that of ammonia so that the production of methanol may be comparable in importance to that of ammonia. According to the present invention, the difficulties which occur owing to the combination of the two syntheses are eliminated as soon as use is made, in suitable conditions, as catalysts for the synthesis of methanol, not of those the main ingredients of which are zinc and chromium, but of a copper catalyst activated by rare earths. The use of copper catalysts for the synthesis of methanol is known per se and its discovery is not claimed herein.

But it was not known that under certain conditions these copper catalysts lead to the synthesis of methanol in such a manner that the formation of compounds undesirable for the synthesis of ammonia should not take place.

The present process for the complete conversion of coke oven gas into methyl alcohol and ammonia, utilizes the process disclosed in the United States Patent application Serial No. 507,750 January 9, 1931, for the preparation of gases intended to be used for syntheses.

The process according to this patent application Serial No. 507,750 consists in that the coke oven gas is first used for the reduction of iron oxides obtained during the manufacture of hydrogen by dissociation of water vapour.

The resulting gas, called "residual gas", is poorer in hydrogen than coke oven gas, but it is laden with water vapour. It is sent in a cracking oven over coke maintained by external heating at a temperature of about 1200° C.; the hydrocarbons and carbon dioxide disappear and a mixture of carbon monoxide, hydrogen and nitrogen is finally obtained, which contains very little sulphur under an organic form, traces of hydrocarbons, and no nitrogen oxides. This treatment is not claimed herein and is mentioned only for indicating the nature of the gaseous mixture treated according to the present process.

The latter will be described with reference to the accompanying drawing, given by way of example, which shows a diagrammatic view of a plant arranged for carrying the said process into practice.

Coke oven gas and water vapour are alternately sent into an oven $a$ which is filled with iron oxides and permanently maintained at a temperature of about 750° C.

Use is conveniently made of a complete battery of such ovens in order to obtain continuous outputs of gas.

The residual gas resulting from the reduction of iron oxides in the oven $a$ is sent, together with the exhaust gas produced at the beginning of the oxidizing period, through a retort $f$ filled with coke maintained at a temperature approximating 1200° C.

A mixture of carbon monoxide, hydrogen and nitrogen issues from the retort $f$.

According to the present invention, the hydrogen issuing from the oven $a$ and the mixture of carbon monoxide, hydrogen and nitrogen issuing from the retort $f$ are used as follows:

The hydrogen produced by dissociation of water vapour is freed from sulphuretted impurities in apparatus $b$ and $c$.

The organic sulphuretted impurities are converted in $b$ into sulphuretted hydrogen according to a known process. The sulphuretted hydrogen is eliminated in $c$. The last traces of sulphuretted hydrogen and the carbon dioxide are absorbed in a column $d$ in which a caustic lye circulates. The purified hydrogen is stored in a gasometer $e$.

On the other hand, the gaseous mixture issuing from the retort $f$ is, after cooling with or without heat recovery in an apparatus not shown in the diagrammatic drawing, purified in elements $g$ $h$ $i$.

These purifying elements substantially correspond to the apparatus $b$ $c$ $d$ used for the purification of hydrogen. The traces of organic sulphuretted impurities are converted into sulphuretted hydrogen in $g$. The sulphuretted hydrogen is eliminated in $h$ by contact with iron oxides. In the column $i$, a caustic lye absorbs the last traces of sulphuretted hydrogen. The purified mixture is led to a gasometer $j$.

In order to be subjected to the two syntheses, the gaseous mixture is extracted from the gasometer $j$ by means of a compressor $k$ which compresses this mixture to a maximum pressure of 200 to 350 kilograms per square centimeter.

The pressure used is so much the lower as the nitrogen content of the mixture is itself lower.

The ratio of carbon monoxide to hydrogen in this gaseous mixture is comprised between $\frac{1}{3}$ and $\frac{1}{5}$.

If the quantity of hydrogen is insufficient, the necessary addition can be effected by means of the gasometer $e$.

After dehydration and removal of oils, the compressed mixture is admitted into a tube 1 containing the catalyst for methanol; this catalyst is obtained for instance by means of copper oxide reduced and actuated by rare earths; it is maintained at a temperature of about 300° C.

A fraction of the constituents (CO and $H_2$) is transformed into methyl alcohol.

The reaction temperature is maintained at about 300° C., on the one hand, by an addition of calories by means of an electric resistance supplied with a current the intensity of which is controlled by a self-induction coil or an induction regulator, and, on the other hand, by the control of the speed of circulation of the mixture.

The methyl alcohol formed is condensed by causing the mixture to pass in a refrigerating apparatus $m$, and is collected in a tank $n$ from which it is drawn off.

The noncombined mixture, freed from methyl alcohol, is re-circulated by means of a pump $o$ provided with a by-pass allowing to control the speed of circulation and having only to overcome the loss of pressure of the circuit.

According as it is desired to combine the totality or a portion of the constituents (CO and $H_2$), the mixture can also be drawn off, from the circuit in which the synthesis of methyl alcohol is effected, through a cock provided with a pressure reducing device $p$, which may be used for controlling the speed of circulation of the mixture in the circuit under consideration.

If it is desired to obtain the nearly total combination of the constituents CO and $H_2$ of the mixture treated, it may be advantageous to place in series several groups of synthesis elements such as $l$, $m$, $n$.

Whatever may be the fraction combined, there remains always available, after the pressure-reducing cock $p$, a gas compressed at 200 kg. containing CO—$H_2$—$N_2$, with traces of methane and carbon dioxide.

This gas is purified by passing through towers such as $q$—$r$ grouped in series and fed, the first, with a cupro-ammonia lye, which eliminates carbon monoxide, and the last, with a caustic lye, which eliminates carbon dioxide.

Pumps (not shown) deliver under pressure the lyes used and distribute them.

The cupro-ammonia lye employed forms with carbon monoxide complex products capable of being destroyed by heating under vacuum at about 80° C. It is thus possible to obtain the release of CO and of the other gases dissolved in the lye, which are stored in a gasometer $s$.

The gas of the gasometer $s$, which is CO, can be used for proportioning the mixture of the gasometer $j$, or it can be subjected, in an independent plant not shown in the drawing, to a catalytic oxidation causing the reaction:

$$CO + H_2O = CO_2 + H_2$$

If this latter procedure is adopted, the gas resulting from this catalytic oxidation, freed from carbon dioxide by washing with water under pressure, is returned to the circuit by the header $u$, before the towers $q$ are reached, after it has been brought to a suitable pressure.

Washing with water under pressure allows to recover carbon dioxide, which can be sent to the furnace $f$, or evacuated into the atmosphere.

The hydrogen obtained by the first operations described and remaining available in the gasometer $e$, is compressed to a suitable pressure and sent into the circuit by the header $u$. This compression can be effected by the above mentioned apparatus serving to compress the gas resulting from the catalytic oxidation indicated above.

The last series of operations is effected on the available gas after passage through towers such as $q$ and $r$ and exclusively constituted by hydrogen, nitrogen and traces of hydrocarbons.

By addition of nitrogen arising from liquefaction of air or from any other source, it is therefore possible to adjust the proportion of nitrogen and hydrogen in the ratio 1 to 3.

The additional nitrogen is sufficiently compressed to be introduced in the circuit.

The addition of nitrogen can conveniently be effected before reaching the towers $q$, $r$, if its purity is not absolute, or, alternatively, after the said towers, this increasing the rapidity of regulation of the gaseous mixture.

For obtaining the conversion into ammonia, it suffices to increase the pressure of the mixture to the suitable degree (compressor $t$) and to treat it in a circuit in which is effected the synthesis of ammonia (circuit not shown in the drawing).

It will be noted that if the synthesis circuit is a closed circuit, an accumulation of hydrocarbons can take place therein. This accumulation of methane has as chief inconvenience to diminish the efficiency owing to the lowering of the partial pressure of the constituents (hydrogen and nitrogen).

However, this is not to be feared if the first operations of the process are conducted in such a way as to obtain a content inferior to 6 or 8/1000 in the mixture available for the synthesis of ammonia. This is what is easily obtained when use is made of the process disclosed in the patent application Serial No. 507,750 for preparing the initial mixture of carbon monoxide, hydrogen and nitrogen and when use is made of a copper catalyst for the synthesis of methanol, as described above.

If, owing to a defective regulation, a too high concentration of methane is obtained, it is necessary to eliminate a portion of the gases from the circuit in which the synthesis of ammonia is produced. This fraction of gases can be sent to the beginning of the circuit, before the furnace $f$.

There is thus no loss of hydrogen and nitrogen. Contrarily to many other systems of combined syntheses in which the proportions of manufactured products are invariable, the process according to the invention allows of varying, in very wide limits, the productions of ammonia and methanol, so that an adjustment of these productions is possible in function of commercial requirements.

I claim:

Process for conversion of coke oven gas and similar gas, steam, and nitrogen into methyl alcohol and ammonia, which consists in passing steam over reduced iron oxide at substantially 750° C. to form a hydrogen containing gas, passing coke oven gas, or similar gas, over the oxidized iron to reduce it, passing the gases arising from this reduction into a cracking stage at substantially 1200° C., separately freeing said hydrogen containing gas and the gas resulting from said cracking from sulfur compounds and carbon dioxide, compressing the latter gas, after adding the required amount of said hydrogen containing gas, to a pressure of 200 to 300 kilograms per square centimeter, passing it at 300° C. over a copper catalyst activated by rare earths to synthesize methanol, separating the methanol, removing residual carbon monoxide and carbon dioxide from the remaining gas mixture, adding the hydrogen containing gas and nitrogen in the proportion required for synthesis or ammonia, and converting the mixture thus obtained into ammonia.

RAYMOND BLONDELLE.